(12) United States Patent
Yamamura et al.

(10) Patent No.: US 9,641,867 B2
(45) Date of Patent: May 2, 2017

(54) IMAGE PROCESSOR

(71) Applicant: MegaChips Corporation, Osaka-shi (JP)

(72) Inventors: Naotsugu Yamamura, Osaka (JP); Akira Okamoto, Osaka (JP); Nobuyuki Takasu, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 19 days.

(21) Appl. No.: 14/919,979

(22) Filed: Oct. 22, 2015

(65) Prior Publication Data

US 2016/0119648 A1  Apr. 28, 2016

(30) Foreign Application Priority Data

Oct. 24, 2014 (JP) ................................. 2014-217812
Oct. 24, 2014 (JP) ................................. 2014-217813

(51) Int. Cl.
| | |
|---|---|
| *G06K 9/36* | (2006.01) |
| *G06K 9/46* | (2006.01) |
| *H04N 19/65* | (2014.01) |
| *H04N 19/44* | (2014.01) |
| *H04N 19/105* | (2014.01) |
| *H04N 19/172* | (2014.01) |
| *H04N 19/164* | (2014.01) |

(52) U.S. Cl.
CPC ........... *H04N 19/65* (2014.11); *H04N 19/105* (2014.11); *H04N 19/164* (2014.11); *H04N 19/172* (2014.11); *H04N 19/44* (2014.11)

(58) Field of Classification Search
None
See application file for complete search history.

(56) References Cited

U.S. PATENT DOCUMENTS

| | | | | |
|---|---|---|---|---|
| 6,111,917 | A * | 8/2000 | Tomita | H04N 21/643 375/240.27 |
| 6,621,868 | B1 * | 9/2003 | Kimata | H04N 21/6377 375/240.27 |
| 6,683,988 | B1 * | 1/2004 | Fukunaga | G06T 9/004 348/E5.003 |
| 8,724,708 | B2 * | 5/2014 | Hashimoto | H04N 19/00933 348/488 |

(Continued)

FOREIGN PATENT DOCUMENTS

JP       3157123       4/2001

*Primary Examiner* — Feng Niu
(74) *Attorney, Agent, or Firm* — Oblon, McClelland, Maier & Neustadt, L.L.P.

(57) ABSTRACT

In an earliest vertical synchronization period after sending an encoded image data is restarted, a first reference image determination circuit determines to employ a local decoded image generated in a vertical synchronization period immediately preceding a vertical synchronization period in which an error occurs among multiple local decoded images stored in a first DRAM as a reference image. In an earliest vertical synchronization period after a decoding circuit is reset, a second reference image determination circuit determines to employ a decoded image generated in the vertical synchronization period immediately preceding the vertical synchronization period in which the error occurs among multiple decoded images stored in a second DRAM as a reference image.

7 Claims, 8 Drawing Sheets

(56) References Cited

U.S. PATENT DOCUMENTS 9,219,925 B2 * 12/2015 Fujita .................. H04N 19/172
2009/0257512 A1 * 10/2009 Demas ............. H04N 21/23608
375/240.27

* cited by examiner

IMAGE PROCESSOR

CROSS REFERENCE TO RELATED APPLICATIONS

The present application is based on, and claims priority from Japanese Patent Application Serial Numbers 2014-217812 and 2014-217813, the disclosure of which is hereby incorporated by reference herein in its entirety.

BACKGROUND

Technical Field

The present disclosure relates to an image processor and more particularly, to a low-delay codec.

Related Art

Low-delay codecs which keep a constant communication rate by employing an intracoded picture (I-picture) only for the leading picture and predictive-coded pictures (P-picture) for all following pictures are in actual use.

In such low-delay codecs, when an error occurs in a decoder due to, for example, a communication error, the decoder notifies an encoder of the error. The encoder that is notified of the error generates coded data of an I-picture as a leading picture after error notification and coded data of P-pictures as following pictures. Then the coded data is sent to the decoder (for example, see the first conventional example in JP3157123B).

SUMMARY

The present disclosure is directed to an image processor including an encoder configured to encode image data to generate encoded image data, and a decoder configured to decode the encoded image data received from the encoder. The encoder includes a first memory, an encoding circuit, an error notification receiving circuit, and a first reference image determination circuit. The decoder includes a second memory, a decoding circuit, an error notification sending circuit, and a second reference image determination circuit. The first memory is configured to store a plurality of local decoded images corresponding to a predetermined number of nearest neighboring vertical synchronization periods. The second memory is configured to store a plurality of decoded images corresponding to a predetermined number of nearest neighboring vertical synchronization periods. In normal processing in an absence of an error in the decoding circuit, the first reference image determination circuit is configured to determine to employ a local decoded image generated in an immediately preceding vertical synchronization period as a reference image, the encoding circuit is configured to perform encoding using the reference image, the second reference image determination circuit is configured to determine to employ a decoded image generated in the immediately preceding vertical synchronization period as a reference image, and the decoding circuit is configured to perform decoding using the reference image. In a presence of an error in a vertical synchronization period in the decoding circuit, the error notification sending circuit is configured to send an error notification including identification information of an errored image in which the error occurs, the error notification receiving circuit is configured to receive the error notification, the first reference image determination circuit is configured to determine to employ a local decoded image generated in a vertical synchronization period immediately preceding the vertical synchronization period in which the error occurs among a plurality of local decoded images stored in the first memory as a reference image in an earliest vertical synchronization period after a restart of sending the encoded image data, the encoding circuit is configured to perform encoding using the reference image, the second reference image determination circuit is configured to determine to employ a decoded image generated in the vertical synchronization period immediately preceding the vertical synchronization period in which the error occurs among a plurality of decoded images stored in the second memory as a reference image in an earliest vertical synchronization period after a return of the decoding circuit, and the decoding circuit is configured to perform decoding using the reference image.

The present disclosure is also directed to an image processor including encoder configured to encode image data to generate encoded image data and a decoder configured to decode the encoded image data received from the encoder. The encoder includes a first memory, an encoding circuit, an error notification receiving circuit, and a first reference image determination circuit. The decoder includes a second memory, a decoding circuit, an error notification sending circuit, and a second reference image determination circuit. The first memory is configured to store a plurality of local decoded images corresponding to a predetermined number of nearest neighboring vertical synchronization periods. The second memory is configured to store a plurality of decoded images corresponding to a predetermined number of nearest neighboring vertical synchronization periods. In normal processing in an absence of an error in the decoding circuit, the first reference image determination circuit is configured to determine to employ a local decoded image generated in a vertical synchronization period of two periods before as a reference image, the encoding circuit is configured to perform encoding using the reference image, the second reference image determination circuit is configured to determine to employ a decoded image generated in the vertical synchronization period of two periods before as a reference image, and the decoding circuit is configured to perform decoding using the reference image. In a presence of an error in a vertical synchronization period in the decoding circuit, the error notification sending circuit is configured to send an error notification including identification information of an errored image in which the error occurs, the error notification receiving circuit is configured to receive the error notification, the first reference image determination circuit is configured to determine to employ a local decoded image generated in a vertical synchronization period immediately preceding the vertical synchronization period in which the error occurs as a reference image in a vertical synchronization period subsequent to the vertical synchronization period in which the error occurs and a vertical synchronization period two periods after the vertical synchronization period in which the error occurs, the encoding circuit is configured to perform encoding using the reference image, the second reference image determination circuit is configured to determine to employ a decoded image generated in the vertical synchronization period immediately preceding the vertical synchronization period in which the error has occurred as a reference image in the vertical synchronization period subsequent to the vertical synchronization period in which the error occurs and the vertical synchronization period two periods after the vertical synchronization period in which the error occurs, and the decoding circuit is configured to perform decoding using the reference image.

The present disclosure is also directed to an image processor including an encoder configured to encode image data to generate encoded image data, and a decoder configured to decode the encoded image data received from the encoder. The encoder includes a first memory, an encoding circuit, an error notification receiving circuit, and a first reference image determination circuit. The decoder includes a second memory, a decoding circuit, an error notification sending circuit, and a second reference image determination circuit. The first memory is configured to store a plurality of local decoded images corresponding to a predetermined number of nearest neighboring vertical synchronization periods. The second memory is configured to store a plurality of decoded images corresponding to a predetermined number of nearest neighboring vertical synchronization periods. In normal processing in an absence of an error in the decoding circuit, for an even-numbered image group, the first reference image determination circuit is configured to determine to employ a local decoded image generated in a vertical synchronization period of two periods before as a reference image, and the second reference image determination circuit is configured to determine to employ a decoded image generated in the vertical synchronization period of two periods before as a reference image, and for an odd-numbered image group, the first reference image determination circuit is configured to determine to employ a local decoded image generated in a vertical synchronization period of three periods before as a reference image, and the second reference image determination circuit is configured to determine to employ a decoded image generated in the vertical synchronization period of three periods before as a reference image. In a presence of an error in a vertical synchronization period belonging to the even-numbered image group in the decoding circuit, the error notification sending circuit is configured to send an error notification including identification information of an errored image in which the error occurs, and the error notification receiving circuit is configured to receive the error notification. In and after a vertical synchronization period two periods after the vertical synchronization period in which the error occurs, for the odd-numbered image group, the first reference image determination circuit is configured to determine to employ the local decoded image generated in the vertical synchronization period of two periods before as a reference image, and the second reference image determination circuit is configured to determine to employ the decoded image generated in the vertical synchronization period of two periods before as a reference image, and for the even-numbered image group, the first reference image determination circuit is configured to determine to employ the local decoded image generate in the vertical synchronization period of three periods before as a reference image, and the second reference image determination circuit is configured to determine to employ the decoded image generated in the vertical synchronization period of three periods before as a reference image.

These and other objects, features, aspects and advantages of the present disclosure will become more apparent from the following detailed description when taken in conjunction with the accompanying drawings.

DETAILED DESCRIPTION

Figure 1:
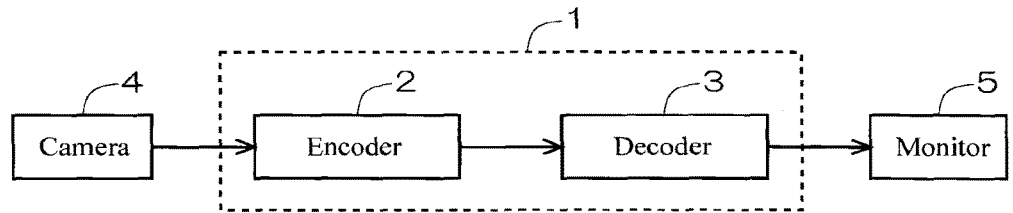
FIG. 1 is a diagram illustrating a configuration of an image processor according to Embodiment 1.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

In the low-delay codec according to the above-described technique, the encoder generates coded data of an I-picture as a leading picture after error notification and sends the coded data to the decoder. Coded data of an I-picture, however, includes more data than that of a P-picture, which causes an elongated time required to send data. Moreover, since the encoder starts configuration to generate a subsequent picture as an I-picture after receiving an error notification, time required before coded data of the I-picture starts to be generated is also elongated. In consequence, delay time between occurrence of and return from an error is increased.

The present disclosure is directed to obtaining an image processor that effectively shortens delay time between occurrence of and return from an error.

According to an aspect of an image processor, if an error occurs in a vertical synchronization period in the decoding circuit, the first reference image determination circuit determines to employ a local decoded image generated in a vertical synchronization period immediately preceding the vertical synchronization period in which the error occurs among a plurality of local decoded image stored in the first memory as a reference image in an earliest vertical synchronization period after sending the encoded image data is restarted, and the encoding circuit performs encoding using the reference image. The second reference image determination circuit determines to employ a decoded image generated in the vertical synchronization period immediately preceding the vertical synchronization period in which the error has occurs among a plurality of decoded images stored in the second memory as a reference image in an earliest vertical synchronization period after a return of the decoding circuit, and the decoding circuit performs decoding using the reference image. Occurrence of an error can be managed only by changing a reference image of the P-picture in the encoder and the decoder, without sending the I-picture from the encoder to the decoder, which helps avoid increase in data transmission time for sending the I-picture. In consequence, delay time between occurrence of and return from an error is effectively shortened.

In some embodiments, the first reference image determination circuit is configured to determine to employ a local decoded image generated in an immediately preceding vertical synchronization period as a reference image in a vertical synchronization period subsequent to an earliest vertical synchronization period after a restart of sending the encoded image data, and the second reference image determination circuit is configured to determine to employ a decoded image generated in the immediately preceding vertical synchronization period as a reference image in a vertical synchronization period subsequent to an earliest vertical synchronization period after the return of the decoding circuit.

According to such embodiments, the first reference image determination circuit determines to employ a local decoded image generated in an immediately preceding vertical synchronization period as a reference image in a vertical synchronization period subsequent to the earliest vertical synchronization period after sending the encoded image data is restarted. The second reference image determination circuit determines to employ a decoded image generated in the immediately preceding vertical synchronization period as a reference image in a vertical synchronization period subsequent to an earliest vertical synchronization period after the return of the decoding circuit. Thus the immediately preceding local decoded image or decoded image is put back as a reference image at an early stage, which effectively minimizes image degradation.

In some embodiments, the decoder further includes an image display controller. The image display controller is configured to instruct to display a predetermined concealing image in the vertical synchronization period in which the error occurs and a vertical synchronization period in which the return of the decoding circuit is performed.

According to such embodiments, the image display controller instructs to display a predetermined concealing image in the vertical synchronization period in which the error occurs and a vertical synchronization period in which the return of the decoding circuit is performed. Since a period in which a concealing image is displayed is minimized, awkwardness that a viewer of the video may feel is effectively reduced.

According to another aspect of an image processor, if an error occurs in a vertical synchronization period in the decoding circuit, the first reference image determination circuit determines to employ a local decoded image generated in a vertical synchronization period immediately preceding the vertical synchronization period in which the error occurs as a reference image in a vertical synchronization period subsequent to the vertical synchronization period in which the error occurs and a vertical synchronization period two periods after the vertical synchronization period in which the error occurs, and the encoding circuit performs encoding using the reference image. The second reference image determination circuit determines to employ a decoded image generated in the vertical synchronization period immediately preceding the vertical synchronization period in which the error occurs as a reference image in the vertical synchronization period subsequent to the vertical synchronization period in which the error occurs and the vertical synchronization period two periods after the vertical synchronization period in which the error occurs, and the decoding circuit performs decoding using the reference image. Occurrence of an error can be managed only by changing a reference image of the P-picture in the encoder and the decoder, without sending the I-picture from the encoder to the decoder, which helps avoid increase in data transmission time for sending the I-picture. Also in the vertical synchronization period subsequent to the vertical synchronization period in which the error occurs, encoding in the encoder and decoding in the decoder are performed appropriately using the reference image. In consequence, delay time between occurrence of and return from an error is effectively shortened.

In some embodiments, the first reference image determination circuit is configured to determine to employ a local decoded image generated in the vertical synchronization period of two periods before as a reference image in a vertical synchronization period subsequent to the vertical synchronization period two periods after the vertical synchronization period in which the error occurs, and the second reference image determination circuit is configured to determine to employ the decoded image generated in the vertical synchronization period of two periods before as a reference image in the vertical synchronization period subsequent to the vertical synchronization period two periods after the vertical synchronization period in which the error occurs.

According to such embodiments, the first reference image determination circuit determines to employ the local decoded image generated in the vertical synchronization period of two periods before as a reference image in a vertical synchronization period subsequent to the vertical synchronization period two periods after the vertical synchronization period in which the error occurs. The second reference image determination circuit determines to employ the decoded image generated in the vertical synchronization period of two periods before as a reference image in the vertical synchronization period subsequent to the vertical synchronization period two periods after the vertical synchronization period in which the error occurs. Thus the local decoded image or decoded image of two periods before is put back as a reference image at an early stage, which effectively minimizes image degradation.

In some embodiments, the decoder further includes an image display controller. The image display controller is configured to instruct to display a predetermined concealing image in the vertical synchronization period in which the error occurs.

According to such embodiments, the image display controller instructs to display a predetermined concealing image in the vertical synchronization period in which the error occurs. Since a period in which a concealing image is displayed is minimized, awkwardness that a viewer of the video may feel is effectively reduced.

In some embodiments, the encoder further includes a return notification receiving circuit. The decoder further includes a return notification sending circuit. When an error occurs in the decoding circuit in a vertical synchronization period and an attempt to return from the error succeeds in a subsequent vertical synchronization period, the return notification sending circuit is configured to send a return notification, and the return notification receiving circuit is configured to receive the return notification, the first reference image determination circuit is configured to determine to employ the local decoded image generated in a vertical synchronization period immediately preceding the vertical synchronization period in which the error occurs as a reference image in a plurality of vertical synchronization periods from the vertical synchronization period subsequent to the vertical synchronization period in which the error occurs until the vertical synchronization period in which the return notification is received, and the second reference image determination circuit is configured to determine to employ the local decoded image generated in the vertical synchronization period immediately preceding the vertical synchronization period in which the error occurs as a reference image in a plurality of vertical synchronization periods from the vertical synchronization period subsequent to the vertical synchronization period in which the error occurs until a vertical synchronization period subsequent to the vertical synchronization period in which the return notification is sent.

According to such embodiments, the first reference image determination circuit determines to employ the local decoded image generated in a vertical synchronization period immediately preceding the vertical synchronization period in which the error occurs as a reference image in a plurality of from the vertical synchronization period subsequent to the vertical synchronization period in which the error occurs until the vertical synchronization period in which the return notification is received. The second reference image determination circuit determines to employ decoded image generated in the vertical synchronization period immediately preceding the vertical synchronization period in which the error occurs as a reference image in a plurality of vertical synchronization periods from the vertical synchronization period subsequent to the vertical synchronization period in which the error occurs until the vertical synchronization period subsequent to the vertical synchronization period in which the return notification is sent. Even with errors in a plurality of successive vertical synchronization periods, encoding in the encoder and decoding in the decoder is still performed appropriately.

In some embodiments, the first reference image determination circuit is configured to determine to employ the local decoded image generated in the vertical synchronization period of two periods before as a reference image in a vertical synchronization period subsequent to the vertical synchronization period in which the return notification is received, and the second reference image determination circuit is configured to determine to employ the decoded image generated in the vertical synchronization period of two periods before as a reference image in a vertical synchronization period two periods after the vertical synchronization period in which the return notification is sent.

According to such embodiments, the first reference image determination circuit determines to employ the local decoded image generated in the vertical synchronization period of two periods before as a reference image in a vertical synchronization period subsequent to the vertical synchronization period in which the return notification is received. The second reference image determination circuit determines to employ the decoded image generated in the vertical synchronization period of two periods before as a reference image in a vertical synchronization period two periods after the vertical synchronization period in which the return notification is sent. Thus the local decoded image or decoded image of two periods before is put back as a reference image at an early stage, which effectively minimizes image degradation.

In some embodiments, the decoder further includes an image display controller. The image display controller is configured to instruct to display a predetermined concealing image in the vertical synchronization period in which the error occurs.

According to such embodiments, the image display controller instructs to display a predetermined concealing image in the vertical synchronization period in which the error occurs. Since a period in which a concealing image is displayed is minimized, awkwardness that a viewer of the video may feel is effectively reduced.

According to another aspect of an image processor, in normal processing in an absence of an error in the decoding circuit, for an even-numbered image group, the first reference image determination circuit determines to employ a local decoded image generated in the vertical synchronization period of two periods before as a reference image, and the second reference image determination circuit determines to employ a decoded image generated in the vertical synchronization period of two periods before as a reference image. For an odd-numbered image group, the first reference image determination circuit determines to employ a local decoded image generated in a vertical synchronization period of three periods before as a reference image, and the second reference image determination circuit determines to employ a decoded image generated in the vertical synchronization period of three periods before as a reference image. If noise occurs in a specific image belonging to the even-numbered image group, the noise propagates into subsequent images in both of the even-numbered and odd-numbered image groups. If noise occurs in a specific image belonging to the odd-numbered image group, the noise does not propagate into subsequent images in any of the even-numbered and odd-numbered image groups. In any of these cases, noise does not propagate into only either one of the even-numbered and odd-numbered image groups. Thus occurrence of flicker is effectively avoided.

If an error occurs in a vertical synchronization period belonging to the even-numbered image group, in and after a vertical synchronization period two periods after the vertical synchronization period in which the error occurs, for the odd-numbered image group, the first reference image determination circuit determines to employ the local decoded image generated in the vertical synchronization period of two periods before as a reference image and the second reference image determination circuit determines to employ the decoded image generated in the vertical synchronization period of two periods before as a reference image. For the even-numbered image group, the first reference image determination circuit determines to employ the local decoded image generated in the vertical synchronization period of three periods before as a reference image and the second reference image determination circuit determine to employ the decoded image generated in the vertical synchronization period of three periods before as a reference image. Thus an image in which an error occurs is not used as a reference image from then on, which helps avoid image degradation. Moreover, changing a reference image of the P-picture in the encoder and the decoder is sufficient, without sending the I-picture from the encoder to the decoder, which helps avoid increase in data transmission time for sending the I-picture. In consequence, delay time between occurrence of and return from an error is effectively shortened.

In another aspect of the present disclosure, an image processor includes an encoder configured to encode image data to generate encoded image data, and a decoder configured to decode the encoded image data received from the encoder. The encoder includes a first memory, an encoding circuit, an error notification receiving circuit, and a first reference image determination circuit. The decoder includes a second memory, a decoding circuit, an error notification sending circuit, and a second reference image determination circuit. The first memory is configured to store a plurality of local decoded images corresponding to a predetermined number of nearest neighboring vertical synchronization periods. The second memory is configured to store a plurality of decoded images corresponding to a predetermined number of nearest neighboring vertical synchronization periods. In normal processing in an absence of an error in the decoding circuit, for an even-numbered image group, the first reference image determination circuit is configured to determine to employ a local decoded image generated in a vertical synchronization period of two periods before as a reference image, and the second reference image determination circuit is configured to determine to employ a decoded image generated in the vertical synchronization period of two periods before as a reference image, and for an odd-numbered image group, the first reference image determination circuit is configured to determine to employ a local decoded image generated in a vertical synchronization period of three periods before as a reference image, and the second reference image determination circuit is configured to determine to employ a decoded image generate in the vertical synchronization period of three periods before as a reference image. In a presence of an error in a vertical synchronization period belonging to the even-numbered image group in the decoding circuit, the error notification sending circuit is configured to send an error notification including identification information of an errored image in which the error occurs and the error notification receiving circuit is configured to receive the error notification, the first reference image determination circuit is configured to determine to employ a local decoded image generated in a vertical synchronization period two periods before a vertical synchronization period in which the error occurs as a reference image in a vertical synchronization period two periods after the vertical synchronization period in which the error occurs and a vertical synchronization period three periods after the vertical synchronization period in which the error occurs and the encoding circuit is configured to perform encoding using the reference image, and the second reference image determination circuit is configured to determine to employ a decoded image generated in the vertical synchronization period two periods before the vertical synchronization period in which the error occurs as a reference image in the vertical synchronization period two periods after the vertical synchronization period in which the error occurs and the vertical synchronization period three periods after the vertical synchronization period in which the error occurs and the decoding circuit being configured to perform decoding using the reference image.

According to such aspect, in normal processing in an absence of an error in the decoding circuit, for an even-numbered image group, the first reference image determination circuit determines to employ a local decoded image generated in the vertical synchronization period of two periods before as a reference image, and the second reference image determination circuit determines to employ a decoded image generated in the vertical synchronization period of two periods before as a reference image. For an odd-numbered image group, the first reference image determination circuit determines to employ a local decoded image generated in a vertical synchronization period of three periods before as a reference image, and the second reference image determination circuit determines to employ a decoded image generated in the vertical synchronization period of three periods before as a reference image. If noise occurs in a specific image belonging to the even-numbered image group, the noise propagates into subsequent images in both of the even-numbered and odd-numbered image groups. If noise occurs in a specific image belonging to the odd-numbered image group, the noise does not propagate into subsequent images in any of the even-numbered and odd-numbered image groups. In any of these cases, noise does not propagate into only either one of the even-numbered and odd-numbered image groups. Thus occurrence of flicker is effectively avoided.

If an error occurs in a vertical synchronization period belonging to the even-numbered image group, the first reference image determination circuit determines to employ a local decoded image generated in the vertical synchronization period two periods before a vertical synchronization period in which the error occurs as a reference image in a vertical synchronization period two periods after the vertical synchronization period in which the error occurs and a vertical synchronization period three periods after the vertical synchronization period in which the error occurs, and the encoding circuit performs encoding using the reference image. The second reference image determination circuit determines to employ a decoded image generated in the vertical synchronization period two periods before the vertical synchronization period in which the error occurs as a reference image in the vertical synchronization period two periods after the vertical synchronization period in which the error occurs and the vertical synchronization period three periods after the vertical synchronization period in which the error occurs, and the decoding circuit performs decoding using the reference image. Thus an image in which an error occurs is not used as a reference image, which helps avoid image degradation. Moreover, changing a reference image of the P-picture in the encoder and the decoder is sufficient, without sending the I-picture from the encoder to the decoder, which helps avoid increase in data transmission time for sending the I-picture. In consequence, delay time between occurrence of and return from an error is effectively shortened.

Some embodiments of the present disclosure effectively shorten delay time between occurrence of and return from an error.

DESCRIPTION OF EMBODIMENTS

Embodiments of the present disclosure are described in detail below referring to the drawings. It should be noted that identical reference numerals throughout the drawings indicate identical or equivalent elements.

Embodiment 1

FIG. 1 is a diagram illustrating a configuration of an image processor 1 according to Embodiment 1 of the present disclosure. As illustrated in FIG. 1, the image processor 1 includes an encoder 2 and a decoder 3. The encoder 2 receives an input of image data of a moving image shot by a camera 4. The encoder 2 encodes the image data input from the camera 4 to generate encoded image data and sends the encoded image data through wired or wireless communication. The decoder 3 decodes the encoded image data received from the encoder 2. The image data decoded by the decoder 3 is input to a monitor 5, and thereby an image is displayed on the monitor 5.

The image processor 1 is configured as a so-called low-delay codec, in which the encoder 2 in a normal operation generates encoded image data of an intracoded picture (I-picture) for a leading picture input from the camera 4 and encoded image data of predictive-coded pictures (P-picture) for following pictures.

Figure 2:
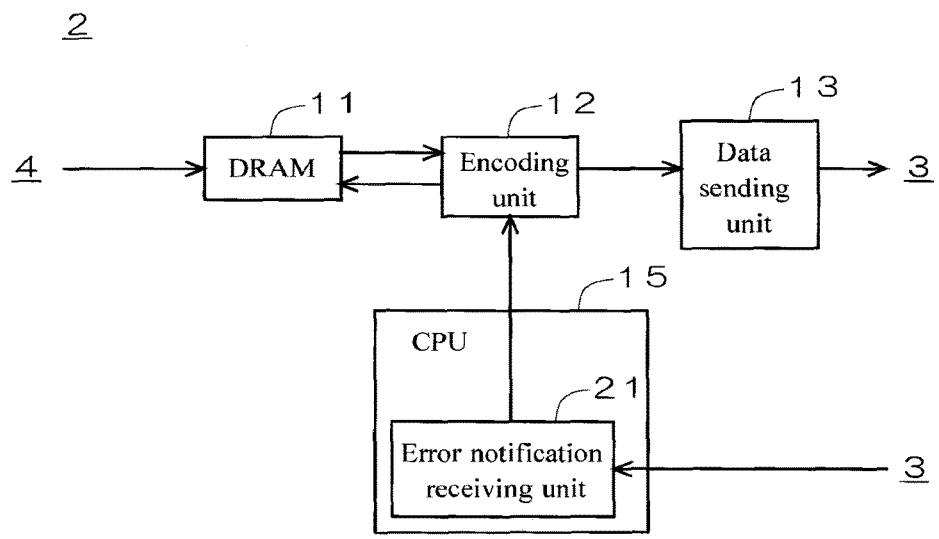
FIG. 2 is a diagram illustrating a configuration of an encoder according to Embodiment 1.

FIG. 2 is a diagram illustrating a configuration of the encoder 2 according to Embodiment 1. As illustrated in FIG. 2, the encoder 2 includes a DRAM 11, an encoding unit 12, a data sending unit 13, and a CPU 15. The CPU 15 runs a predetermined program to function as an error notification receiving unit 21.

Figure 3:
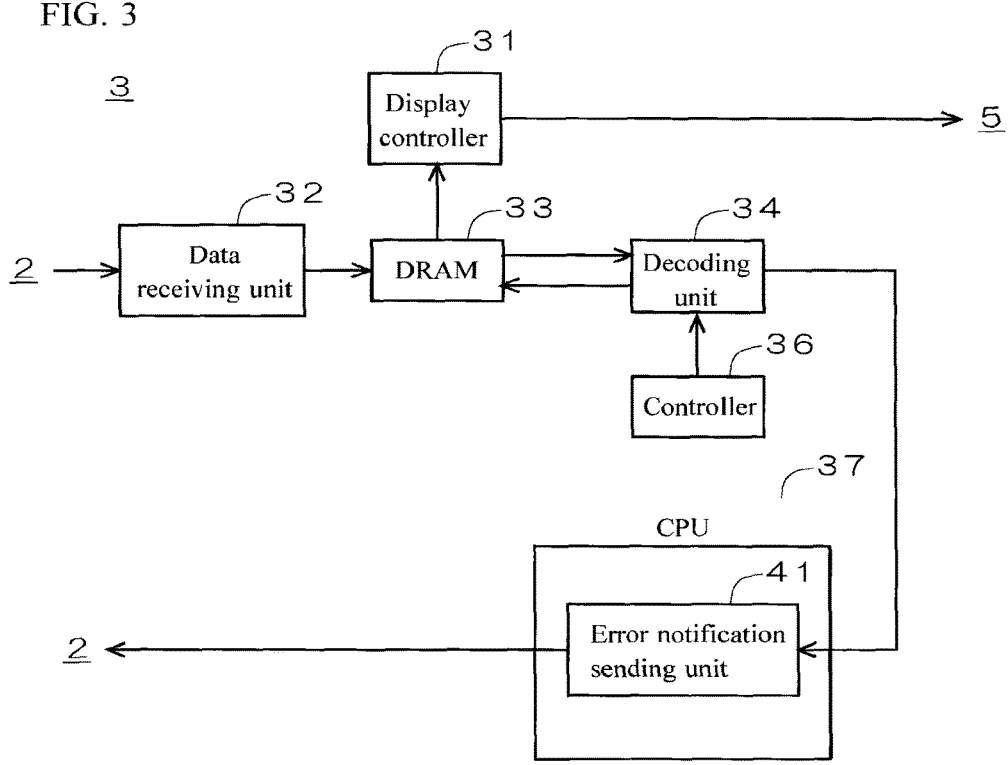
FIG. 3 is a diagram illustrating a configuration of a decoder according to Embodiment 1.

FIG. 3 is a diagram illustrating a configuration of the decoder 3 according to Embodiment 1. As illustrated in FIG. 3, the decoder 3 includes a display controller 31, a data receiving unit 32, a DRAM 33, a decoding unit 34, a controller 36, and a CPU 37. The CPU 37 runs a predetermined program to function as an error notification sending unit 41.

Figure 4:
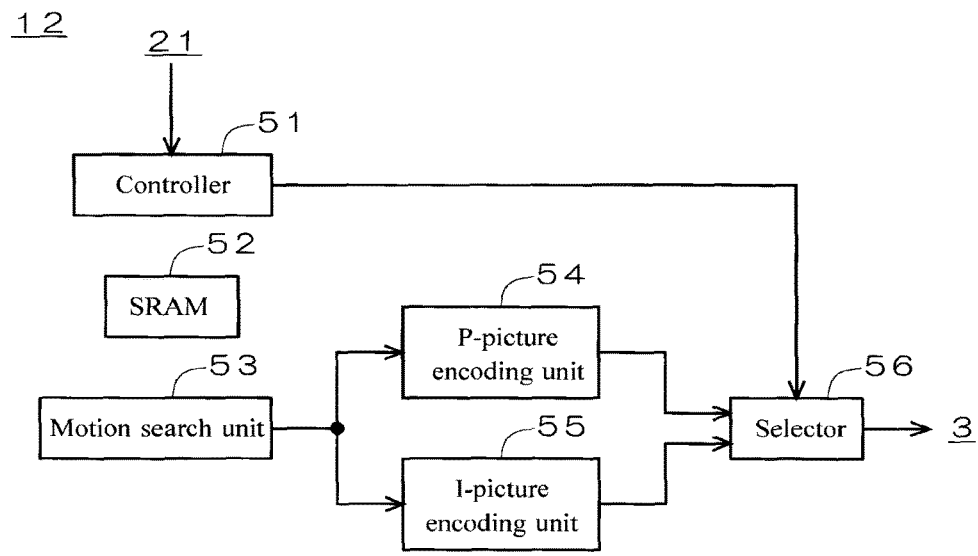
FIG. 4 is a simplified diagram illustrating a configuration an encoding unit.

FIG. 4 is a simplified diagram illustrating a configuration of the encoding unit 12. As illustrated in FIG. 4, the encoding unit 12 may comprise suitable logic, circuitry, interfaces, and/or code, including a controller 51, an SRAM 52, a motion search unit 53, a P-picture encoding unit 54, an I-picture encoding unit 55, and a selector 56. The P-picture encoding unit 54 and the I-picture encoding unit 55 each comprise suitable logic, circuitry, interfaces, and/or code, including a DCT transform circuit, a quantization circuit, an entropy-coding circuit, an inverse quantization circuit, an inverse DCT transform circuit, a deblocking filter, and a NAL-unit generation circuit, which are not illustrated in the figure.

Figure 5:
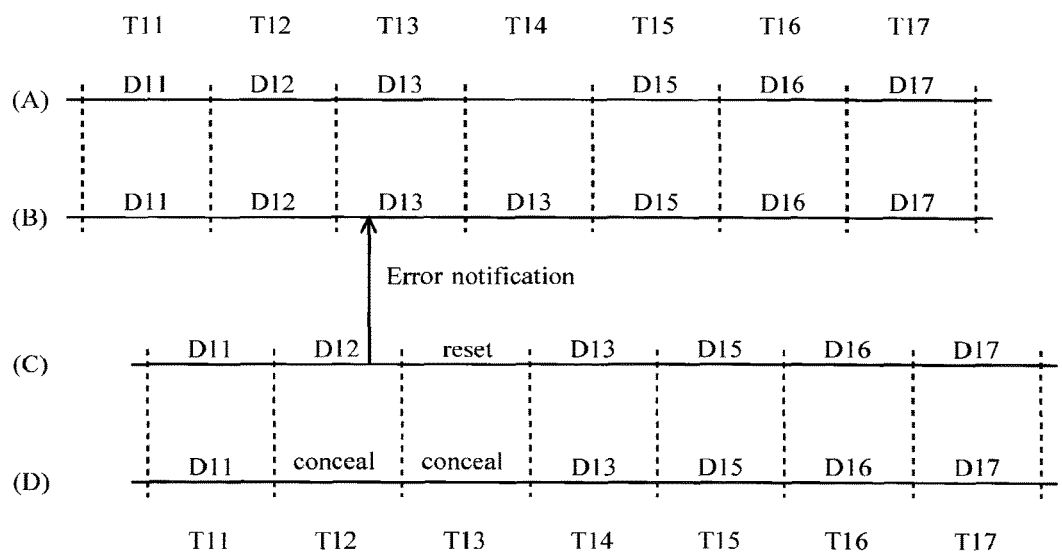
FIG. 5 is a diagram for illustrating processing in occurrence of an error in a decoding unit.

FIG. 5 is a diagram for illustrating processing in occurrence of an error in the decoding unit 34. (A) represents image data to be encoded by the encoding unit 12, (B) represents image data to be sent from the data sending unit 13 to the data receiving unit 32, (C) represents image data to be decoded by the decoding unit 34, and (D) represents image data to be displayed on the monitor 5 by the display controller 31. Each of the vertical synchronization periods T11 to T17 is provided with a predetermined time required to process one P-picture within one vertical synchronization period. FIG. 5 exemplifies a case where an error occurs while the decoding unit 34 is decoding image data D12 in the vertical synchronization period T12.

In normal processing in an absence of an error in the decoding unit 34, the P-picture encoding unit 54 performs inter-screen predictive coding using a local decoded image generated immediately before as a reference image to generate encoded image data of a P-picture. The I-picture encoding unit 55 performs intra-screen coding without a reference image to generate encoded image data of an I-picture. The controller 51 instructs the selector 56 to select the P-picture encoding unit 54, so that the encoded image data of the P-picture is sent from the data sending unit 13 to the data receiving unit 32. The P-picture encoding unit 54 generates a local decoded image to be used as a reference image along with the encoded image data, and the local decoded image is stored in the DRAM 11 for a certain period of time.

The decoding unit 34, which may comprise suitable logic, circuitry, interfaces, and/or code, decodes the encoded image data received by the data receiving unit 32, and the display controller 31 instructs the monitor 5 to display the decoded image data. Referring to FIG. 5, in a vertical synchronization period before occurrence of an error, for example, in the vertical synchronization period T11, (A) the encoding unit 12 generates encoded image data D11 of P- and I-pictures, (B) the data sending unit 13 sends the encoded image data D11 of the P-picture, (C) the decoding unit 34 decodes the encoded image data D11 of the P-picture, and (D) the display controller 31 instructs the monitor 5 to display the decoded image data D11. The decoded image generated by the decoding unit 34 is stored in the DRAM 33 for a certain period of time for use as a reference image.

If an error occurs, for example, if encoded image data to be decoded is depleted in a buffer in the DRAM 33, the decoding unit 34 inputs information on occurrence of the error and identification (picture ID) of the image data with the error to the error notification sending unit 41. The error notification sending unit 41, which may comprise suitable logic, circuitry, interfaces, and/or code, sends an error notification including the above information to the encoder 2, and the error notification receiving unit 21, which may comprise suitable logic, circuitry, interfaces, and/or code, receives the error notification. Similar to the above, the P-picture encoding unit 54 has generated the encoded image data of the P-picture and the I-picture encoding unit 55 has generated the encoded image data of the I-picture. The controller 51, upon receipt of an input of the error notification from the error notification receiving unit 21, instructs the selector 56 to select the I-picture encoding unit 55. The encoded image data of the I-picture is thereby sent from the data sending unit 13 to the data receiving unit 32.

Referring to FIG. 5, if an error occurs while the decoding unit 34 is decoding the image data D12 in the vertical synchronization period T12, an error notification is sent from the error notification sending unit 41 to the error notification receiving unit 21. In this case, the display controller 31 produces a concealing image on the basis of the decoded image data D12, and instructs the monitor 5 to display the concealing image in the vertical synchronization period T12. In order to produce the concealing image, the display controller 31 employs, for example, the image data D12 for image areas of which decoding has been completed in the vertical synchronization period T12 before occurrence of the error and the immediately preceding image data D11 for the remaining image areas of which decoding has not been completed in the vertical synchronization period T12.

The CPU 37 resets the decoding unit 34 to return from the error in a vertical synchronization period T13 subsequent to the vertical synchronization period T12 in which the error has occurred. The display controller 31 instructs the monitor 5 to display the same concealing image as in the vertical synchronization period T12 also during the reset period of the decoding unit 34 (vertical synchronization period T13).

In the example illustrated in FIG. 5, at the time when the error notification receiving unit 21 receives the error notification, processing in the subsequent vertical synchronization period T13 has been started in the encoder 2. In the vertical synchronization period T13, the data sending unit 13 sends encoded image data D13 of the P-picture until the error notification is received. Upon receipt of the error notification, the data sending unit 13 stops sending the encoded image data D13 of the P-picture, and then the controller 51 instructs the selector 56 to select the I-picture encoding unit 55, so that the data sending unit 13 starts to send the encoded image data D13 of the I-picture. Since the encoded image data of the I-picture includes much data, the data cannot be sent within one vertical synchronization period. Thus the encoded image data D13 of the I-picture is sent from the data sending unit 13 to the data receiving unit 32 in two vertical synchronization periods T13 and T14. In the encoder 2, the vertical synchronization period T14 is used for sending the image data D13, and thus the encoding unit 12 omits encoding of image data D14.

In the decoder 3 in the vertical synchronization period T14 after reset, the decoding unit 34 decodes the encoded image data D13 of the I-picture and the display controller 31 instructs the monitor 5 to display decoded image data D13.

In a subsequent vertical synchronization period T15, the encoder 2 and the decoder 3 return to normal processing. (A) the encoding unit 12 generates encoded image data D15 of the P- and I-pictures, (B) the data sending unit 13 sends the encoded image data D15 of the P-picture, (C) the decoding unit 34 decodes the encoded image data D15 of the P-picture, and (D) the display controller 31 instructs the monitor 5 to display the decoded image data D15. The P-picture encoding unit 54 employs local decoded image generated immediately before (image data D13 here) as a reference image in generating the encoded image data D15 of the P-picture.

As described above, in the image processor 1 according to Embodiment 1, the encoding unit 12 includes the P-picture encoding unit 54 and the I-picture encoding unit 55 that operate in parallel, so that encoded image data of the I-picture in addition to that of the P-picture is generated in normal processing in an absence of an error. Upon receipt of an error notification by the error notification receiving unit 21 from the error notification sending unit 41, selection by the selector 56 is switched so that encoded image data of the I-picture is immediately sent from the data sending unit 13 to the data receiving unit 32. In this way, the encoder 2 generates the encoded image data of the I-picture in advance along with that of the P-picture in normal processing, instead of starting configuration to generate a subsequent picture as an I-picture after receiving an error notification. Thus delay time between occurrence of and return from an error is effectively shortened, with no waiting time before generation of coded data of the I-picture.

Embodiment 2

Figure 6:
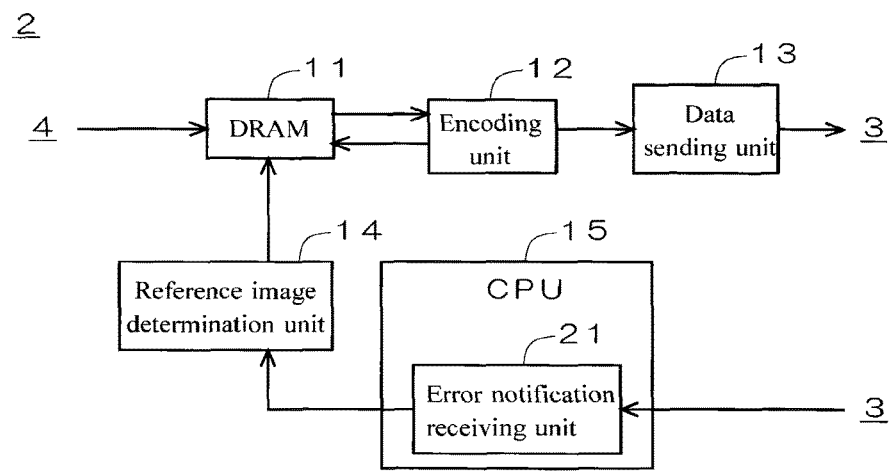
FIG. 6 is a diagram illustrating a configuration of the encoder according to Embodiment 2.

FIG. 6 is a diagram illustrating a configuration of an encoder 2 according to Embodiment 2 of the present disclosure. As illustrated in FIG. 6, the encoder 2 includes a DRAM 11, an encoding unit 12, a data sending unit 13, a reference image determination unit 14, and a CPU 15. The reference image determination unit 14 may comprise suitable logic, circuitry, interfaces, and/or code. The CPU 15 runs a predetermined program to function as an error notification receiving unit 21. The DRAM 11 stores multiple local decoded images generated by the encoding unit 12 in a predetermined number of (at least three) nearest neighboring vertical synchronization periods.

Figure 7:
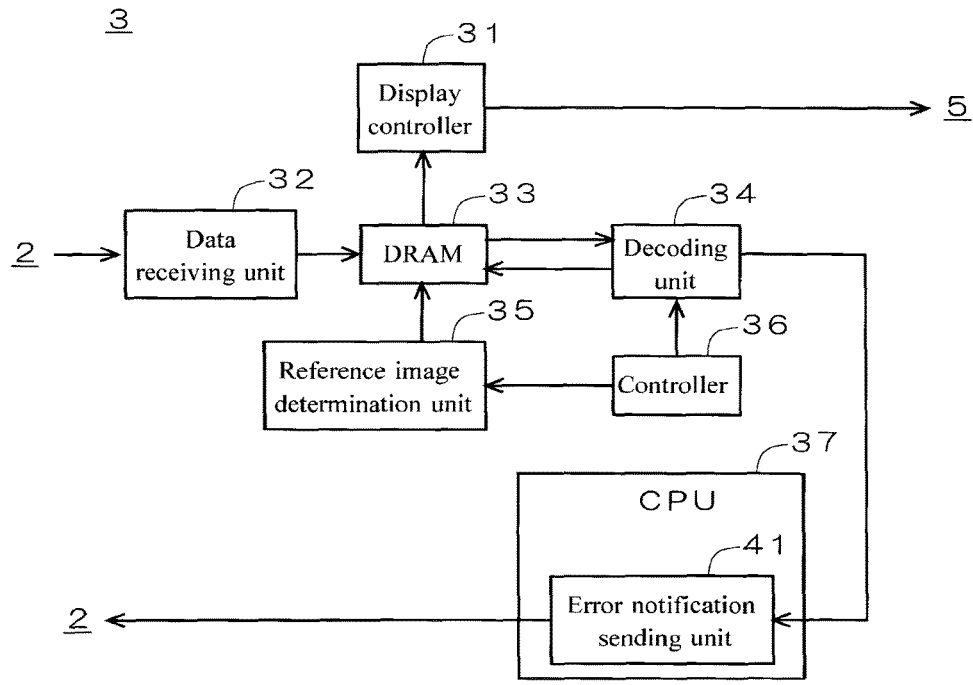
FIG. 7 is a diagram illustrating a configuration a decoder according to Embodiment 2.

FIG. 7 is a diagram illustrating a configuration of a decoder 3 according to Embodiment 2. As illustrated in FIG. 7, the decoder 3 includes a display controller 31, a data receiving unit 32, a DRAM 33, a decoding unit 34, a reference image determination unit 35, a controller 36, and a CPU 37. The reference image determination unit 35 may comprise suitable logic, circuitry, interfaces, and/or code. The CPU 37 runs a predetermined program to function as an error notification sending unit 41. The DRAM 33 stores multiple decoded images generated by the decoding unit 34 in a predetermined number of (at least three) nearest neighboring vertical synchronization periods.

Figure 8:
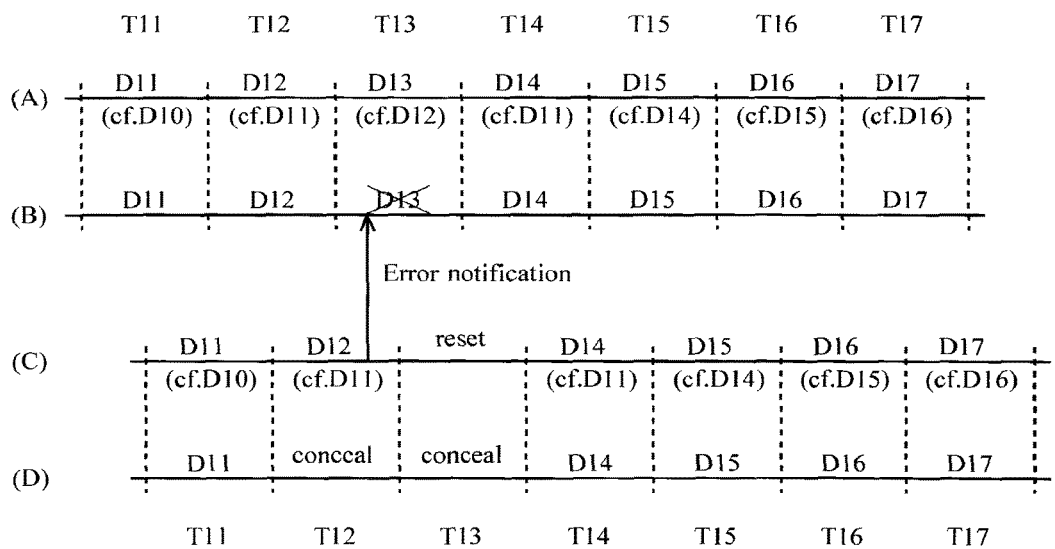
FIG. 8 is a diagram for illustrating processing in occurrence of an error in the decoding unit.

FIG. 8 is a diagram for illustrating processing in occurrence of an error in the decoding unit 34. (A) represents image data to be encoded by the encoding unit 12, (B) represents image data to be sent from the data sending unit 13 to the data receiving unit 32, (C) represents image data to be decoded by the decoding unit 34, and (D) represents image data to be displayed on the monitor 5 by the display controller 31. FIG. 8 exemplifies a case where an error occurs while the decoding unit 34 is decoding image data D12 in the vertical synchronization period T12.

In normal processing in an absence of an error in the decoding unit 34, in the encoder 2, the reference image determination unit 14 determines to employ a local decoded image generated in an immediately preceding vertical synchronization period as a reference image. The encoding unit 12 performs inter-screen predictive coding using the reference image to generate encoded image data of a P-picture. The encoded image data of the P-picture is sent from the data sending unit 13 to the data receiving unit 32. For a leading picture input from the camera 4, encoded image data of an I-picture is generated, which is not illustrated in FIG. 8. The encoding unit 12 generates a local decoded image to be used as a reference image along with the encoded image data, and the local decoded image is stored in the DRAM 11 for a certain period of time.

Similarly, in normal processing in an absence of an error in the decoding unit 34, in the decoder 3, the reference image determination unit 35 determines to employ a decoded image generated in the immediately preceding vertical synchronization period as a reference image. The decoding unit 34 uses the reference image to decode encoded image data of a P-picture. The display controller 31 instructs the monitor 5 to display the decoded image data. The decoded image generated by the decoding unit 34 is stored in the DRAM 33 for a certain period of time for use as a reference image.

Referring to FIG. 8, in a vertical synchronization period before occurrence of an error, for example, in the vertical synchronization period T11, (A) the encoding unit 12 generates the encoded image data D11 of the P-picture using immediately preceding image data D10 read from the DRAM 11 as a reference image, (B) the data sending unit 13 sends the encoded image data D11 of the P-picture, (C) the decoding unit 34 decodes the encoded image data D11 of the P-picture using the immediately preceding image data D10 read from the DRAM 33 as a reference image, and (D) the display controller 31 instructs the monitor 5 to display the decoded image data D11.

If an error occurs in the decoding unit 34, the decoding unit 34 inputs information on occurrence of the error and identification (picture ID) of the image data with the error to the error notification sending unit 41. The error notification sending unit 41 sends an error notification including the above information to the encoder 2, and the error notification receiving unit 21 receives the error notification. The error notification receiving unit 21 inputs the received error notification to the reference image determination unit 14.

In the decoder 3, the vertical synchronization period subsequent to the vertical synchronization period in which the error has occurred is used as a reset period for resetting the decoding unit 34 to return from the error. Thus also in the encoder 2, sending the encoded image data is stopped in the vertical synchronization period corresponding to the reset period, and sending the encoded image data is restarted from the vertical synchronization period subsequent to the reset period.

In the earliest vertical synchronization period after sending the encoded image data is restarted, the reference image determination unit 14 determines to employ a local decoded image generated in a vertical synchronization period immediately preceding the vertical synchronization period in which the error has occurred among multiple local decoded images stored in the DRAM 11 as a reference image. The encoding unit 12 performs encoding using the reference image.

In the earliest vertical synchronization period after the decoding unit 34 is reset, the reference image determination unit 35 determines to employ a decoded image generated in a vertical synchronization period immediately preceding the vertical synchronization period in which the error has occurred among multiple decoded images stored in the DRAM 33 as a reference image. The decoding unit 34 performs decoding using the reference image.

Referring to FIG. 8, if an error occurs while the decoding unit 34 is decoding the image data D12 in the vertical synchronization period T12, an error notification is sent from the error notification sending unit 41 to the error notification receiving unit 21. In this case, the display controller 31 produces a concealing image on the basis of the decoded image data D12, and instructs the monitor 5 to display the concealing image in the vertical synchronization period T12. In order to produce the concealing image, the display controller 31 employs, for example, the image data D12 for image areas of which decoding has been completed in the vertical synchronization period T12 and the immediately preceding image data D11 for the remaining image areas of which decoding has not been completed in the vertical synchronization period T12.

The CPU 37 resets the decoding unit 34 to return from the error in a vertical synchronization period T13 subsequent to the vertical synchronization period T12 in which the error has occurred. The display controller 31 instructs the monitor 5 to display the same concealing image as in the vertical synchronization period T12 also during the reset period of the decoding unit 34 (vertical synchronization period T13).

In the example illustrated in FIG. 8, at the time when the error notification receiving unit 21 receives the error notification, processing in the subsequent vertical synchronization period T13 has been started in the encoder 2. In the vertical synchronization period T13, the data sending unit 13 sends encoded image data D13 of the P-picture until the error notification is received. Upon receipt of the error notification, the data sending unit 13 stops sending the encoded image data D13 of the P-picture.

In the earliest vertical synchronization period T14 after sending the encoded image data is restarted, the reference image determination unit 14 determines to employ the image data D11 generated in the vertical synchronization period T11 immediately preceding the vertical synchronization period T12 in which the error has occurred as a reference image. The encoding unit 12 generates encoded image data D14 of the P-picture, using the image data D11 read from the DRAM 11 as a reference image. The data sending unit 13 sends the encoded image data D14 of the P-picture.

In the earliest vertical synchronization period T14 after the decoding unit 34 is reset, the reference image determination unit 35 determines to employ the image data D11 generated in the vertical synchronization period T11 immediately preceding the vertical synchronization period T12 in which the error has occurred as a reference image. The decoding unit 34 decodes the encoded image data D14, using the image data D11 read from the DRAM 33 as a reference image. The display controller 31 instructs the monitor 5 to display the decoded image data D14.

In a subsequent vertical synchronization period T15, the encoder 2 and the decoder 3 return to normal processing. (A) the encoding unit 12 generates encoded image data D15 of the P-picture using the immediately preceding image data D14 read from the DRAM 11 as a reference image, (B) the data sending unit 13 sends the encoded image data D15 of the P-picture, (C) the decoding unit 34 decodes the encoded image data D15 of the P-picture, using the immediately preceding image data D14 read from the DRAM 33 as a reference image, and (D) the display controller 31 instructs the monitor 5 to display the decoded image data D15.

As described above, in the image processor 1 according to Embodiment 2, if an error occurs in the decoding unit 34 in a certain vertical synchronization period T12, in the earliest vertical synchronization period T14 after sending the encoded image data is restarted, the reference image determination unit 14 determines to employ the local decoded image (image data D11) generated in the vertical synchronization period T11 immediately preceding the vertical synchronization period T12 in which the error has occurred among multiple local decoded images stored in the DRAM 11 as a reference image, and the encoding unit 12 performs encoding using the reference image. In the earliest vertical synchronization period T14 after the decoding unit 34 is reset, the reference image determination unit 35 determines to employ the decoded image (image data D11) generated in the vertical synchronization period T11 immediately preceding the vertical synchronization period T12 in which the error has occurred among multiple decoded images stored in the DRAM 33 as a reference image, and the decoding unit 34 performs decoding using the reference image. Occurrence of an error can be managed only by changing a reference image of the P-picture in the encoder 2 and the decoder 3, without sending the I-picture from the encoder 2 to the decoder 3, which helps avoid increase in data transmission time for sending the I-picture. In consequence, delay time between occurrence of and return from an error is effectively shortened.

The reference image determination unit 14 returns to normal processing in the vertical synchronization period T15 subsequent to the earliest vertical synchronization period T14 after sending the encoded image data is restarted, and determines to employ the local decoded image (image data D14) generated in the immediately preceding vertical synchronization period T14 as a reference image. The reference image determination unit 35 returns to normal processing in the vertical synchronization period T15 subsequent to the earliest vertical synchronization period T14 after the decoding unit 34 is reset, and determines to employ the decoded image (image data D14) generated in the immediately preceding vertical synchronization period T14 as a reference image. Thus the immediately preceding local decoded image or decoded image is put back as a reference image at an early stage, which effectively minimizes image degradation.

The display controller 31 instructs the monitor 5 to display a predetermined concealing image in the vertical synchronization period T12 in which the error has occurred and the vertical synchronization period T13 in which the decoding unit 34 is reset. Since a period in which a concealing image is displayed is minimized, awkwardness that a viewer of the video may feel is effectively reduced.

Embodiment 3

The configuration of the encoder 2 and the decoder 3 according to Embodiment 3 of the present disclosure is the same as that illustrated in FIGS. 6 and 7.

Figure 9:
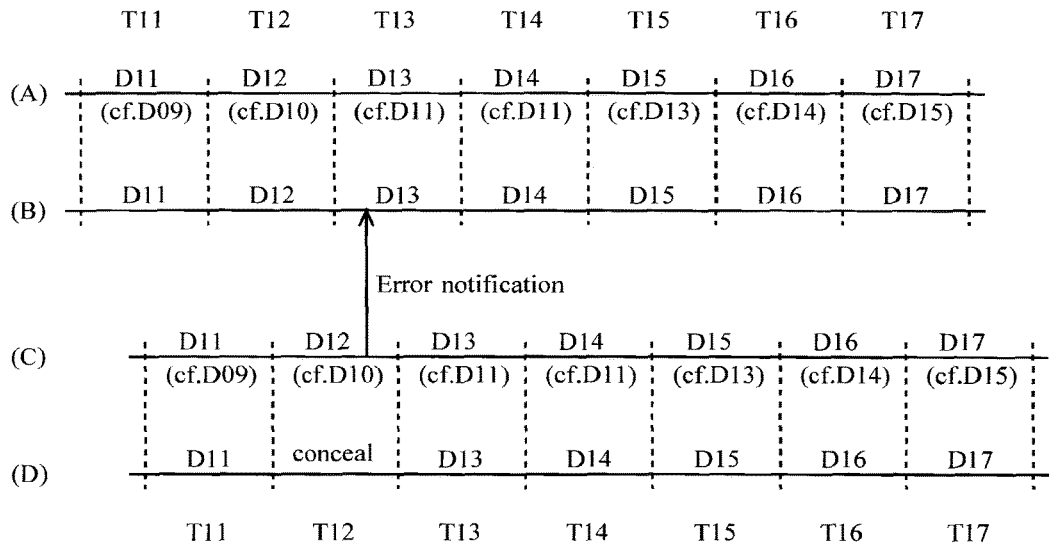
FIG. 9 is a diagram for illustrating processing in occurrence of an error in the decoding unit.

FIG. 9 is a diagram for illustrating processing in occurrence of an error in the decoding unit 34. (A) represents image data to be encoded by the encoding unit 12, (B) represents image data to be sent from the data sending unit 13 to the data receiving unit 32, (C) represents image data to be decoded by the decoding unit 34, and (D) represents image data to be displayed on the monitor 5 by the display controller 31. FIG. 9 exemplifies a case where an error occurs while the decoding unit 34 is decoding image data D12 in the vertical synchronization period T12.

In normal processing in an absence of an error in the decoding unit 34, in the encoder 2, the reference image determination unit 14 determines to employ a local decoded image generated in a vertical synchronization period of two periods before as a reference image. The encoding unit 12 performs inter-screen predictive coding using the reference image to generate encoded image data of a P-picture. The encoded image data of the P-picture is sent from the data sending unit 13 to the data receiving unit 32. For a leading picture input from the camera 4, encoded image data of an I-picture is generated, which is not illustrated in FIG. 9. The encoding unit 12 generates a local decoded image to be used as a reference image along with the encoded image data, and the local decoded image is stored in the DRAM 11 for a certain period of time.

Similarly, in normal processing in an absence of an error in the decoding unit 34, in the decoder 3, the reference image determination unit 35 determines to employ a decoded image generated in the vertical synchronization period of two periods before as a reference image. The decoding unit 34 uses the reference image to decode the encoded image data of a P-picture. The display controller 31 instructs the monitor 5 to display the decoded image data. The decoded image generated by the decoding unit 34 is stored in the DRAM 33 for a certain period of time for use as a reference image.

Referring to FIG. 9, in a vertical synchronization period before occurrence of an error, for example, in the vertical synchronization period T11, (A) the encoding unit 12 generates the encoded image data D11 of the P-picture using image data D09 of two periods before read from the DRAM 11 as a reference image, (B) the data sending unit 13 sends the encoded image data D11 of the P-picture, (C) the decoding unit 34 decodes the encoded image data D11 of the P-picture using the image data D09 of two periods before read from the DRAM 33 as a reference image, and (D) the display controller 31 instructs the monitor 5 to display the decoded image data D11.

If an error occurs in the decoding unit 34, the decoding unit 34 inputs information on occurrence of the error and identification (picture ID) of the image data with the error to the error notification sending unit 41. The error notification sending unit 41 sends an error notification including the above information to the encoder 2, and the error notification receiving unit 21 receives the error notification. The error notification receiving unit 21 inputs the received error notification to the reference image determination unit 14.

In the vertical synchronization period subsequent to the vertical synchronization period in which the error has occurred and the vertical synchronization period two periods after the vertical synchronization period in which the error has occurred, the reference image determination unit 14 determines to employ a local decoded image generated in a vertical synchronization period immediately preceding the vertical synchronization period in which the error has occurred as a reference image. The encoding unit 12 performs encoding using the reference image.

In the vertical synchronization period subsequent to the vertical synchronization period in which the error has occurred and the vertical synchronization period two periods after the vertical synchronization period in which the error has occurred, the reference image determination unit 35 determines to employ the decoded image generated in the vertical synchronization period immediately preceding the vertical synchronization period in which the error has occurred as a reference image. The decoding unit 34 performs decoding using the reference image.

Referring to FIG. 9, if an error occurs while the decoding unit 34 is decoding the image data D12 in the vertical synchronization period T12, an error notification is sent from the error notification sending unit 41 to the error notification receiving unit 21. In this case, the display controller 31 produces a concealing image on the basis of the decoded image data D12, and instructs the monitor 5 to display the concealing image in the vertical synchronization period T12. In order to produce the concealing image, the display controller 31 employs, for example, the image data D12 for image areas of which decoding has been completed in the vertical synchronization period T12 and the immediately preceding image data D11 for the remaining image areas of which decoding has not been completed in the vertical synchronization period T12.

After the concealing image is produced, the controller 36 resets the decoding unit 34 to return from the error in the vertical synchronization period T12 in which the error has occurred. With no enough time for the CPU 37 to reset by software processing, early reset of the decoding unit 34 is realized by hardware processing in which the controller 36 automatically configures a register for the reset.

In the example illustrated in FIG. 9, at the time when the error notification receiving unit 21 receives the error notification, processing in the vertical synchronization period T13 has been started in the encoder 2. In a vertical synchronization period T13 subsequent to the vertical synchronization period T12 in which the error has occurred, the reference image determination unit 14 determines to employ the image data D11 generated in the vertical synchronization period T11 immediately preceding the vertical synchronization period T12 in which the error has occurred as a reference image. The encoding unit 12 generates encoded image data D13 of the P-picture, using the image data D11 read from the DRAM 11 as a reference image. The data sending unit 13 sends the encoded image data D13 of the P-picture.

In the vertical synchronization period T13, the reference image determination unit 35 determines to employ the image data D11 generated in the vertical synchronization period T11 immediately preceding the vertical synchronization period T12 in which the error has occurred as a reference image. The decoding unit 34 decodes the encoded image data D13, using the image data D11 read from the DRAM 33 as a reference image. The display controller 31 instructs the monitor 5 to display the decoded image data D13.

In the vertical synchronization period T14 two periods after the vertical synchronization period T12 in which the error has occurred, the reference image determination unit 14 determines to employ the image data D11 generated in the vertical synchronization period T11 immediately preceding the vertical synchronization period T12 in which the error has occurred as a reference image. The encoding unit 12 generates encoded image data D14 of the P-picture, using the image data D11 read from the DRAM 11 as a reference image. The data sending unit 13 sends the encoded image data D14 of the P-picture.

In the vertical synchronization period T14, the reference image determination unit 35 determines to employ the image data D11 generated in the vertical synchronization period T11 immediately preceding the vertical synchronization period T12 in which the error has occurred as a reference image. The decoding unit 34 decodes the encoded image data D14, using the image data D11 read from the DRAM 33 as a reference image. The display controller 31 instructs the monitor 5 to display the decoded image data D14.

In a subsequent vertical synchronization period T15, the encoder 2 and the decoder 3 return to normal processing. (A) the encoding unit 12 generates encoded image data D15 of the P-picture using the image data D13 of two periods before read from the DRAM 11 as a reference image, (B) the data sending unit 13 sends the encoded image data D15 of the P-picture, (C) the decoding unit 34 decodes the encoded image data D15 of the P-picture using the image data D13 of two periods before read from the DRAM 33 as a reference image, (D) the display controller 31 instructs the monitor 5 to display the decoded image data D15.

As described above, in the image processor 1 according to Embodiment 3, if an error occurs in the decoding unit 34 in a certain vertical synchronization period T12, in the vertical synchronization period T13 subsequent to the vertical synchronization period T12 in which the error has occurred and the vertical synchronization period T14 two periods after the vertical synchronization period T12 in which the error has occurred, the reference image determination unit 14 determines to employ the local decoded image (image data D11) generated in the vertical synchronization period T11 immediately preceding the vertical synchronization period T12 in which the error has occurred as a reference image, and the encoding unit 12 performs encoding using the reference image. In the vertical synchronization period T13 subsequent to the vertical synchronization period T12 in which the error has occurred and the vertical synchronization period T14 two periods after the vertical synchronization period T12 in which the error has occurred, the reference image determination unit 35 determines to employ the decoded image (image data D11) generated in the vertical synchronization period T11 immediately preceding the vertical synchronization period T12 in which the error has occurred as a reference image, and the decoding unit 34 performs decoding using the reference image. Occurrence of an error can be managed only by changing a reference image of the P-picture in the encoder 2 and the decoder 3, without sending the I-picture from the encoder 2 to the decoder 3, which helps avoid increase in data transmission time for sending the I-picture. Also in the vertical synchronization period T13 subsequent to the vertical synchronization period T12 in which the error has occurred, encoding in the encoder 2 and decoding in the decoder are performed 3 appropriately using the reference image. In consequence, delay time between occurrence of and return from an error is effectively shortened.

The reference image determination unit 14 returns to normal processing in the vertical synchronization period T15 subsequent to the vertical synchronization period T14 two periods after the vertical synchronization period T12 in which the error has occurred, and determines to employ the local decoded image (image data D13) generated in the vertical synchronization period T13 of two periods before as a reference image. The reference image determination unit 35 returns to normal processing in the vertical synchronization period T15 subsequent to the vertical synchronization period T14 two periods after the vertical synchronization period T12 in which the error has occurred, and determines to employ the decoded image (image data D13) generated in the vertical synchronization period T13 of two periods before as a reference image. Thus the local decoded image or decoded image of two periods before is put back as a reference image at an early stage, which effectively minimizes image degradation.

The display controller 31 instructs the monitor 5 to display a predetermined concealing image in the vertical synchronization period T12 in which the error has occurred. Since a period in which a concealing image is displayed is minimized, awkwardness that a viewer of the video may feel is effectively reduced.

Embodiment 4

In Embodiment 4, description is given of measures against occurrence of errors in successive multiple vertical synchronization periods in Embodiment 3.

Figure 10:
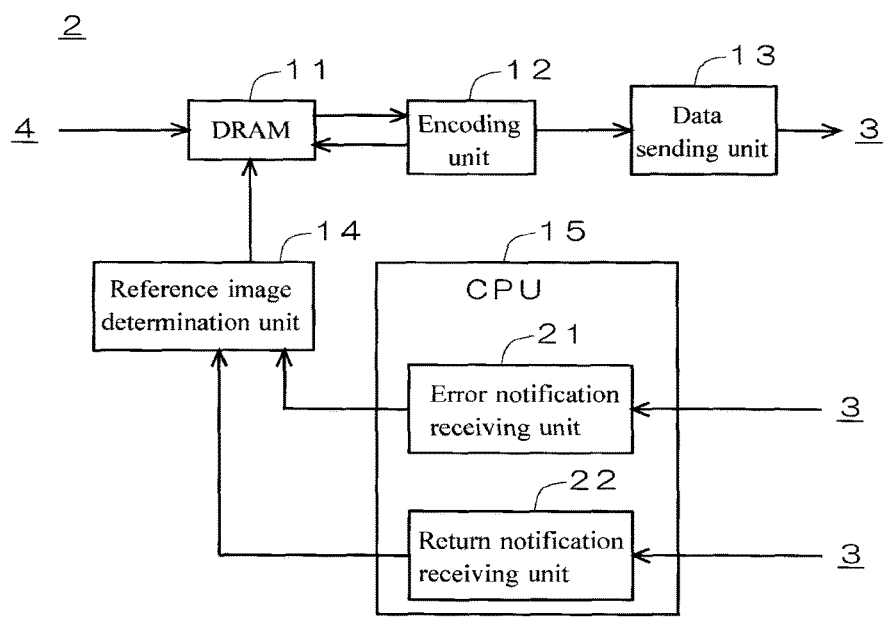
FIG. 10 is a diagram illustrating a configuration of the encoder according to Embodiment 4.

FIG. 10 is a diagram illustrating a configuration of the encoder 2 according to Embodiment 4 of the present disclosure. As illustrated in FIG. 10, the encoder 2 includes a DRAM 11, an encoding unit 12, a data sending unit 13, a reference image determination unit 14, and a CPU 15. The CPU 15 runs a predetermined program to function as an error notification receiving unit 21 and a return notification receiving unit 22. The DRAM 11 stores multiple local decoded images generated by the encoding unit 12 in a predetermined number of nearest neighboring vertical synchronization periods.

Figure 11:
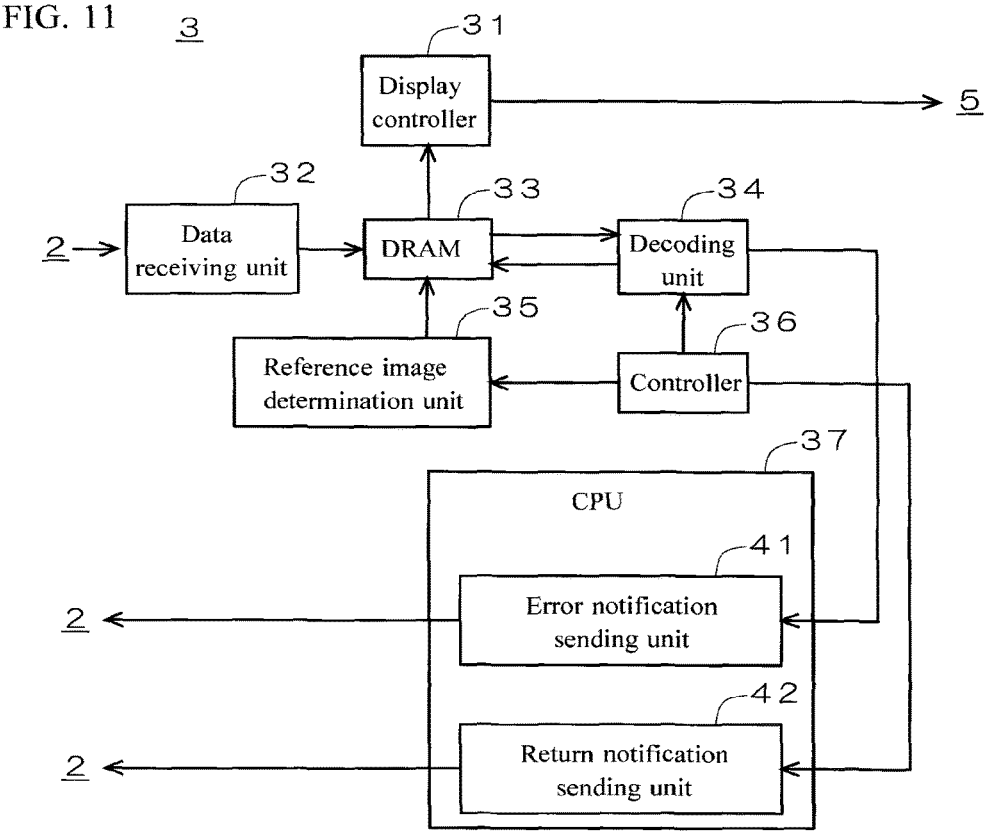
FIG. 11 is a diagram illustrating a configuration of the decoder according to Embodiment 4.

FIG. 11 is a diagram illustrating a configuration of the decoder 3 according to Embodiment 4. As illustrated in FIG. 11, the decoder 3 includes a display controller 31, a data receiving unit 32, a DRAM 33, a decoding unit 34, a reference image determination unit 35, a controller 36, and a CPU 37. The CPU 37 runs a predetermined program to function as an error notification sending unit 41 and a return notification sending unit 42. The DRAM 33 stores multiple decoded images generated by the decoding unit 34 in a predetermined number of nearest neighboring vertical synchronization periods.

Figure 12:
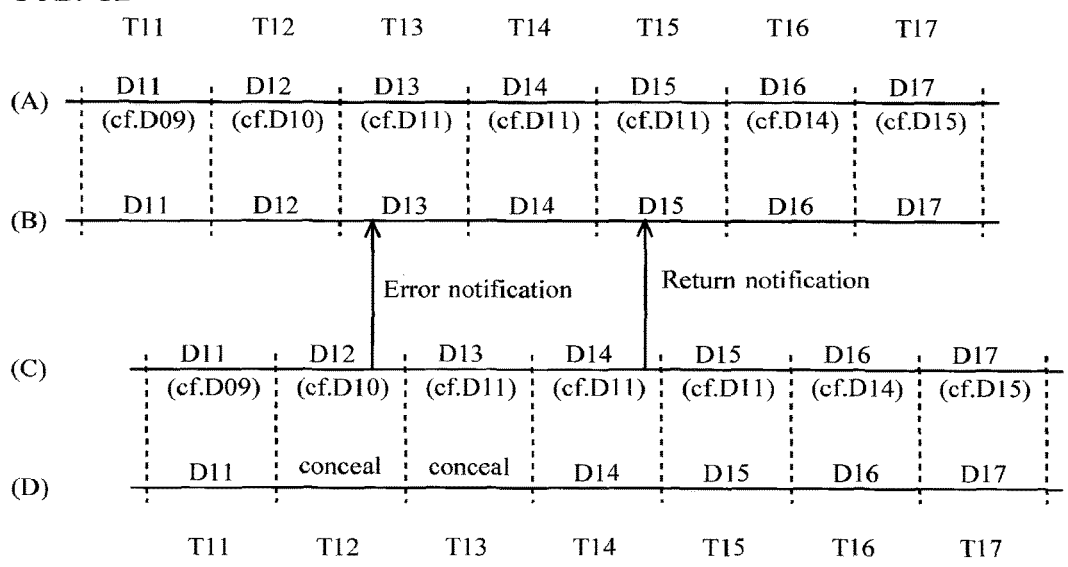
FIG. 12 is a diagram for illustrating processing in occurrence of an error in the decoding unit.

FIG. 12 is a diagram for illustrating processing in occurrence of an error in the decoding unit 34. (A) represents image data to be encoded by the encoding unit 12, (B) represents image data to be sent from the data sending unit 13 to the data receiving unit 32, (C) represents image data to be decoded by the decoding unit 34, and (D) represents image data to be displayed on the monitor 5 by the display controller 31. FIG. 12 exemplifies a case where an error occurs in the successive multiple vertical synchronization periods T12 and T13, an attempt to return from the error fails in the vertical synchronization periods T12 and T13, and an attempt to return from the error succeeds in the vertical synchronization period T14.

In normal processing in an absence of an error in the decoding unit 34, similar to Embodiment 3 above, the reference image determination unit 14 determines to employ a local decoded image generated in a vertical synchronization period of two periods before as a reference image. The encoded image data of the P-picture is sent from the data sending unit 13 to the data receiving unit 32. The reference image determination unit 35 determines to employ decoded image generated in a vertical synchronization period of two periods before as a reference image. The display controller 31 instructs the monitor 5 to display the decoded image data.

Referring to FIG. 12, in a vertical synchronization period before occurrence of an error, for example, in the vertical synchronization period T11, (A) the encoding unit 12 generates the encoded image data D11 of the P-picture using image data D09 of two periods before read from the DRAM 11 as a reference image, (B) the data sending unit 13 sends the encoded image data D11 of the P-picture, (C) the decoding unit 34 decodes the encoded image data D11 of the P-picture using the image data D09 of two periods before read from the DRAM 33 as a reference image, and (D) the display controller 31 instructs the monitor 5 to display the decoded image data D11.

If an error occurs in the decoding unit 34, the decoding unit 34 inputs information on occurrence of the error and identification (picture ID) of the image data with the error to the error notification sending unit 41. The error notification sending unit 41 sends an error notification including the above information to the encoder 2, and the error notification receiving unit 21 receives the error notification. The error notification receiving unit 21 inputs the received error notification to the reference image determination unit 14.

If a reset to return from the error is performed in the decoding unit 34 and decoding of one picture is completed without an error, the controller 36 inputs a return notification to the return notification sending unit 42. The return notification sending unit 42, which may comprise suitable logic, circuitry, interfaces, and/or code, sends a return notification to the encoder 2, and the return notification receiving unit 22, which may comprise suitable logic, circuitry, interfaces, and/or code, receives the return notification. The return notification receiving unit 22 inputs the received return notification to the reference image determination unit 14.

In multiple vertical synchronization periods from the vertical synchronization period subsequent to the vertical synchronization period in which the error has occurred until the return notification is received, the reference image determination unit 14 determines to employ a local decoded image generated in a vertical synchronization period immediately preceding the vertical synchronization period in which the error has occurred among multiple local decoded images stored in the DRAM 11 as a reference image. In these vertical synchronization periods, the encoding unit 12 performs encoding using the reference image.

In multiple vertical synchronization periods from the vertical synchronization period subsequent to the vertical synchronization period in which the error has occurred until the vertical synchronization period subsequent to the vertical synchronization period in which the return notification is sent, the reference image determination unit 35 determines to employ a decoded image generated in the vertical synchronization period immediately preceding the vertical synchronization period in which the error has occurred among multiple decoded images stored in the DRAM 33 as a reference image. The decoding unit 34 performs decoding using the reference image.

Referring to FIG. 12, if an error occurs in the decoding unit 34 in the vertical synchronization period T12, an error notification is sent from the error notification sending unit 41 to the error notification receiving unit 21. In this case, the display controller 31 produces a concealing image on the basis of the image data D12 decoded in the vertical synchronization period T12, and instructs the monitor 5 to display the concealing image in the vertical synchronization period T12. In order to produce the concealing image, the display controller 31 employs, for example, the image data D12 for image areas of which decoding has been completed in the vertical synchronization period T12 and the immediately preceding image data D11 for the remaining image areas of which decoding has not been completed in the vertical synchronization period T12.

After the concealing image is produced, the controller 36 attempts to reset the decoding unit 34 to return from the error in the vertical synchronization period T12. In the example illustrated in FIG. 12, the attempt to return from the error by the controller 36 in the vertical synchronization period T12 fails, and the return notification sending unit 42 sends no return notification.

In the example illustrated in FIG. 12, at the time when the error notification receiving unit 21 receives the error notification, processing in the vertical synchronization period T13 has been started in the encoder 2. In the vertical synchronization period T13, the reference image determination unit 14 determines to employ the image data D11 generated in the vertical synchronization period T11 immediately preceding the vertical synchronization period T12 in which the error has occurred as a reference image. The encoding unit 12 performs encoding using the reference image to generate the encoded image data D13. In the vertical synchronization period T13, the data sending unit 13 sends the encoded image data D13.

In the vertical synchronization period T13, the reference image determination unit 35 determines to employ the image data D11 generated in the vertical synchronization period T11 immediately preceding the vertical synchronization period T12 in which the error has occurred as a reference image. The decoding unit 34 starts to decode the image data D13 using the reference image. In the example illustrated in FIG. 12, an error occurs in the decoding unit 34 also in the vertical synchronization period T13. In this case, in the vertical synchronization period T13, the display controller 31 instructs the monitor 5 to display the concealing image produced in the vertical synchronization period T12. The controller 36 attempts to reset the decoding unit 34 to return from the error also in the vertical synchronization period T13, but in the example illustrated in FIG. 12, the attempt to return from the error by the controller 36 in the vertical synchronization period T13 fails, and the return notification sending unit 42 sends no return notification.

In the subsequent vertical synchronization period T14, the reference image determination unit 14 determines to employ the image data D11 as a reference image, in the same way as in the vertical synchronization period T13. The encoding unit 12 performs encoding using the reference image to generate the encoded image data D14. In the vertical synchronization period T14, the data sending unit 13 sends the encoded image data D14.

The controller 36 attempts to reset the decoding unit 34 to return from the error also in the vertical synchronization period T14. In the example illustrated in FIG. 12, the attempt to return from the error by the controller 36 succeeds in the vertical synchronization period T14. In the vertical synchronization period T14, the reference image determination unit 35 determines to employ the image data D11 as a reference image, in the same way as in the vertical synchronization period T13. The decoding unit 34 starts to decode the image data D14 using the reference image. A reset to return from the error is performed and decoding of one picture is completed without an error, so that the return notification sending unit 42 sends a return notification to the return notification receiving unit 22.

In the example illustrated in FIG. 12, at the time when the return notification receiving unit 22 receives the return notification, processing in the vertical synchronization period T15 has been started in the encoder 2. In the vertical synchronization period T15, the reference image determination unit 14 determines to employ the image data D11 as a reference image, in the same way as in the vertical synchronization period T13. The encoding unit 12 performs encoding using the reference image to generate the encoded image data D15. The data sending unit 13 sends the encoded image data D15 to the data receiving unit 32.

In the vertical synchronization period T15 subsequent to the vertical synchronization period T14 in which the return notification is sent, the reference image determination unit 35 determines to employ the image data D11 as a reference image, in the same way as in the vertical synchronization period T13. The decoding unit 34 decodes the encoded image data D15, using the image data D11 read from the DRAM 33 as a reference image. The display controller 31 instructs the monitor 5 to display the decoded image data D15.

In a subsequent vertical synchronization period T16, the encoder 2 and the decoder 3 returns to normal processing. (A) the encoding unit 12 generates encoded image data D16 of the P-picture, using the image data D14 of two periods before read from the DRAM 11 as a reference image, (B) the data sending unit 13 sends the encoded image data D16 of the P-picture, (C) the decoding unit 34 decodes the encoded image data D16 of the P-picture using the image data D14 of two periods before read from the DRAM 33 as a reference image, (D) the display controller 31 instructs the monitor 5 to display the decoded image data D16.

As described above, in the image processor 1 according to Embodiment 4, in the multiple vertical synchronization periods T13 to T15 from the vertical synchronization period T13 subsequent to the vertical synchronization period T12 in which the error has occurred until the vertical synchronization period T15 in which a return notification is received, the reference image determination unit 14 determines to employ the local decoded image (image data D11) generated in the vertical synchronization period T11 immediately preceding the vertical synchronization period T12 in which the error has occurred as a reference image. In the multiple vertical synchronization periods T13 to T15 from the vertical synchronization period T13 subsequent to the vertical synchronization period T12 in which the error has occurred until the vertical synchronization period T15 subsequent to the vertical synchronization period T14 in which the return notification is sent, the reference image determination unit 35 determines to employ the decoded image (image data D11) generated in the vertical synchronization period T11 immediately preceding the vertical synchronization period T12 in which the error has occurred as a reference image. Even with errors in successive multiple vertical synchronization periods T12 and T13, encoding in the encoder 2 and decoding in the decoder 3 are still performed appropriately.

The reference image determination unit 14 returns to normal processing in the vertical synchronization period T16 subsequent to the vertical synchronization period T15 in which the return notification is received, and determines to employ the local decoded image (image data D14) generate in the vertical synchronization period T14 of two periods before as a reference image. The reference image determination unit 35 returns to normal processing in the vertical synchronization period T16 two periods after the vertical synchronization period T14 in which the return notification is sent, and determines to employ the decoded image (image data D14) generated in the vertical synchronization period T14 of two periods before as a reference image. Thus the local decoded image or decoded image of two periods before is put back as a reference image at an early stage, which effectively minimizes image degradation.

The display controller 31 instructs to display a predetermined concealing image in the vertical synchronization periods T12 and T13 in which the errors have occurred. Since a period in which a concealing image is displayed is minimized, awkwardness that a viewer of the video may feel is effectively reduced.

Embodiment 5

In Embodiment 5, description is given of measures against occurrence of flicker in Embodiments 3 and 4 above.

Figure 13:
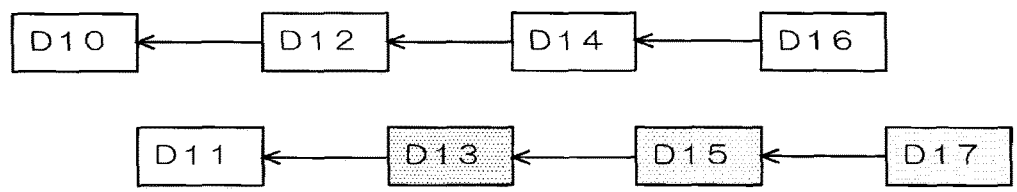
FIG. 13 is a diagram illustrating reference between successive multiple images.

FIGS. 13 to 16 are diagrams illustrating reference between successive multiple images. As illustrated in FIG. 13, in Embodiments 3 and 4 above, the reference image determination units 14 and 35 in normal processing in an absence of an error determine to employ an image generated in a vertical synchronization period of two periods before as a reference image. For example, in generating the image data D12, the image data D10 of two periods before is used as a reference image, and in generating the image data D13, the image data D11 of two periods before is used as a reference image. All image data are categorized into image data D10, D12, D14, and D16 belonging to an even-numbered image group and image data D11, D13, D15, and D17 belonging to an odd-numbered image group.

An example described here is a case where noise occurs in one piece of the image data, the image data D13, belonging to the odd-numbered image group. In this case, since the image data D15 refers to the image data D13 and the image data D17 refers to the image data D15, noise that occurs in the image data D13 propagates into the image data D15 and D17. In contrast, since the image data D14 and D16 do not refer to the image data D13, noise that occurs in the image data D13 does not propagate into the image data D14 and D16. Thus flicker may occur if there is a big difference in image quality between the image data D13, D15, and D17 and the image data D14 and D16.

Figure 14:
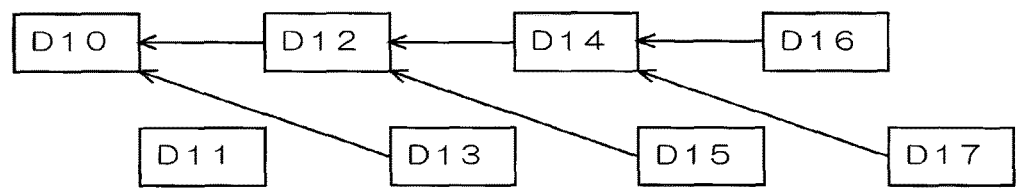
FIG. 14 is a diagram illustrating reference between successive multiple images.

In Embodiment 5, as illustrated in FIG. 14, in normal processing in an absence of an error, the reference image determination units 14 and 35 determine to employ an image generated in a vertical synchronization period of two periods before for even-numbered image group and an image generated in a vertical synchronization period of three periods before for odd-numbered image group as a reference image. For example, in generating the image data D12, the image data D10 of two periods before is used as a reference image, and in generating the image data D13, the image data D10 of three periods before is used as a reference image.

Figure 15:
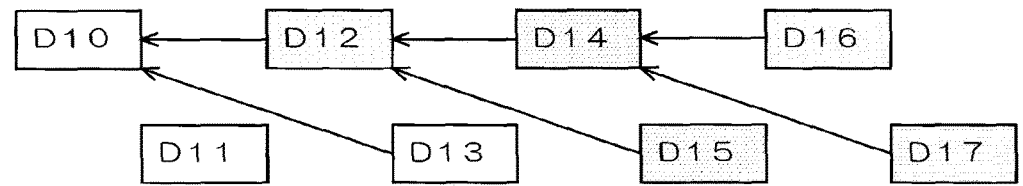
FIG. 15 is a diagram illustrating reference between successive multiple images.
Figure 16:
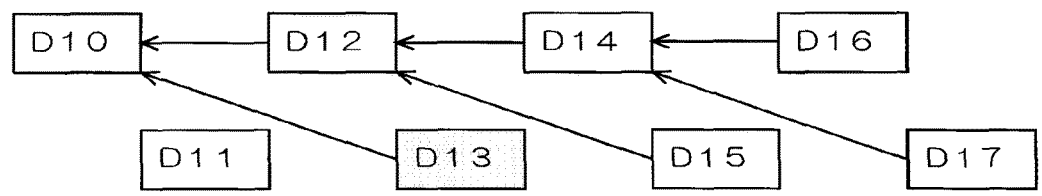
FIG. 16 is a diagram illustrating reference between successive multiple images.

As described above, in the image processor 1 according to Embodiment 5, in normal processing in an absence of an error in the decoding unit 34, the reference image determination unit 14 determines to employ a local decoded image generated in the vertical synchronization period of two periods before as a reference image, and the reference image determination unit 35 determines to employ the decoded image generated in the vertical synchronization period of two periods before as a reference image, for the even-numbered image group. For the odd-numbered image group, the reference image determination unit 14 determines to employ the local decoded image generated in the vertical synchronization period of three periods before as a reference image, and the reference image determination unit 35 determines to employ the decoded image generated in the vertical synchronization period of three periods before as a reference image. Thus as illustrated in FIG. 15, if noise occurs in specific image data D12 belonging to the even-numbered image group, the noise propagates into subsequent image data in both of the even-numbered and odd-numbered image groups. As illustrated in FIG. 16, if noise occurs in specific image data D13 belonging to the odd-numbered image group, the noise does not propagate into subsequent image data in any of the even-numbered and odd-numbered image groups. In any of these cases, noise does not propagate into only either one of the even-numbered and odd-numbered image groups. Thus occurrence of flicker is effectively avoided.

Using an image of three periods before for both of the even-numbered and odd-numbered image groups as a reference image, or mixing at regular intervals a period in which an image of two periods before is referred to and a period in which an image of three periods before is referred to also helps avoid occurrence of flicker. In Embodiments 1 and 2 above, immediately preceding image data is referred to, and thus no flicker occurs.

Embodiment 6

In Embodiment 6, description is given of a first measure against occurrence of an error in the decoding unit 34 in Embodiment 5 above.

Figure 17:
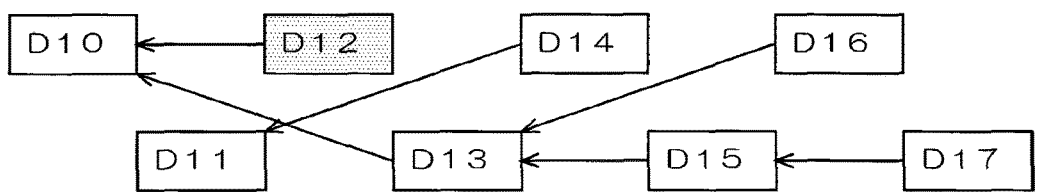
FIG. 17 is a diagram illustrating reference between successive multiple images.

FIG. 17 is a diagram illustrating reference between successive multiple images. In normal processing in an absence of an error, as illustrated in FIG. 14, the reference image determination units 14 and 35 determine to employ an image generated in a vertical synchronization period of two periods before as a reference image for the even-numbered image group, and an image generated in a vertical synchronization period of three periods before for the odd-numbered image group.

Here, if an error occurs in a specific image (image data D12 in the example of FIG. 17) belonging to the even-numbered image group, reference for the even-numbered and odd-numbered image groups is swapped in and after the vertical synchronization period two periods after the vertical synchronization period in which the error has occurred. In other words, as illustrated in FIG. 17, in and after the image data D14 two periods after the image data D12 in which the error has occurred, the reference image determination units 14 and 35 determine to employ an image generated in a vertical synchronization period of two periods before as a reference image for the odd-numbered image group (D15 and D17), and an image generated in a vertical synchronization period of three periods before for the even-numbered image group (D14 and D16).

In normal processing before occurrence of the error as illustrated in FIG. 14, since images belonging to the odd-numbered image group are not used as a reference image, if an error occurs in an image belonging to the odd-numbered image group, no special error handling is necessary, and moreover, even an error notification from the decoder 3 to the encoder 2 can be omitted. In normal processing after occurrence of the error as illustrated in FIG. 17, if an error occurs in an image belonging to the odd-numbered image group afterwards, reference for the even-numbered and odd-numbered image groups can be swapped in the same way as described above.

As described above, in the image processor 1 according to Embodiment 6, if an error occurs in a certain vertical synchronization period belonging to the even-numbered image group, in and after the vertical synchronization period two periods after the vertical synchronization period in which the error has occurred, the reference image determination unit 14 determines to employ a local decoded image generated in the vertical synchronization period of two periods before as a reference image, and the reference image determination unit 35 determines to employ a decoded image generated in the vertical synchronization period of two periods before as a reference image, for odd-numbered image group. For even-numbered image group, the reference image determination unit 14 determines to employ a local decoded image generated in the vertical synchronization period of three periods before as a reference image, and the reference image determination unit 35 determines to employ a decoded image generate in the vertical synchronization period of three periods before as a reference image. Thus an image in which an error occurs is not used as a reference image from then on, which helps avoid image degradation. Moreover, changing a reference image of the P-picture in the encoder 2 and the decoder 3 is sufficient, without sending the I-picture from the encoder 2 to the decoder 3, which helps avoid increase in data transmission time for sending the 1-picture. In consequence, delay time between occurrence of and return from an error is effectively shortened.

Embodiment 7

In Embodiment 7, description is given of a second measures against occurrence of errors in the decoding unit 34 in Embodiment 5.

Figure 18:
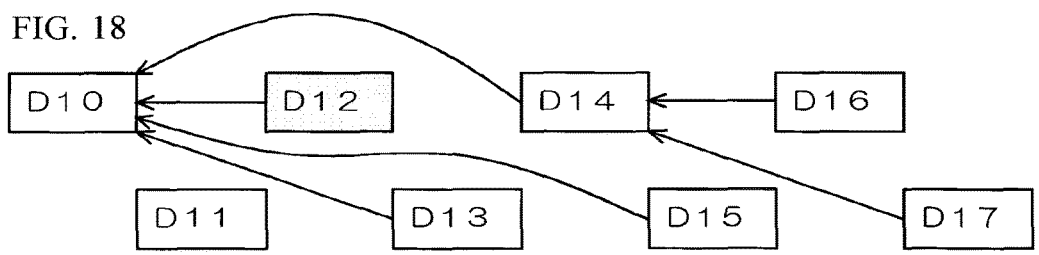
FIG. 18 is a diagram illustrating reference between successive multiple images.

FIG. 18 is a diagram illustrating reference between successive multiple images. In normal processing in an absence of an error, as illustrated in FIG. 14, the reference image determination units 14 and 35 determine to employ an image generated in a vertical synchronization period of two periods before as a reference image for the even-numbered image group, and an image generated in a vertical synchronization period of three periods before for the odd-numbered image group.

Here, if an error occurs in a specific image (image data D12 in the example of FIG. 18) belonging to the even-numbered image group, the reference image determination units 14 and 35 change the reference so that the image in which the error has occurred is not used as a reference image. In other words, as illustrated in FIG. 14, the image data D12 is referred to by the image data D14 and D15, and thus as illustrated in FIG. 18, the image data which the image data D14 and D15 refer to is changed from the image data D12 to the image data D10.

In normal processing before occurrence of the error as illustrated in FIG. 14, since images belonging to the odd-numbered image group are not used as a reference image, if an error occurs in an image belonging to the odd-numbered image group, no special error handling is necessary, and moreover, even an error notification from the decoder 3 to the encoder 2 can be omitted.

The return notification described in Embodiment 4 above may be applied in Embodiment 7. If applied, until the encoder 2 receives the return notification from the decoder 3, the image data D13 and all subsequent image data, that is, image data D13 to D17, refer to the image data D12. When the return notification is received, reference is brought back to normal processing.

As described above, in the image processor 1 according to Embodiment 7, if an error occurs in a certain vertical synchronization period belonging to the even-numbered image group, the reference image determination unit 14 determines to employ a local decoded image generated in the vertical synchronization period two periods before the vertical synchronization period in which the error has occurred as a reference image in the vertical synchronization period two periods after the vertical synchronization period in which the error has occurred and the vertical synchronization period three periods after the vertical synchronization period in which the error has occurred. The reference image determination unit 35 determines to employ a decoded image generated in the vertical synchronization period two periods before the vertical synchronization period in which the error has occurred as a reference image in the vertical synchronization period two periods after the vertical synchronization period in which the error has occurred and the vertical synchronization period three periods after the vertical synchronization period in which the error has occurred. Thus the image data D12 in which an error occurs is not used as a reference image, which helps avoid image degradation. Moreover, changing a reference image of the P-picture in the encoder 2 and the decoder 3 is sufficient, without sending the I-picture from the encoder 2 to the decoder 3, which helps avoid increase in data transmission time for sending the I-picture. In consequence, delay time between occurrence of and return from an error is effectively shortened.

Modification

In Embodiment 1 above, instead of implementing the I-picture encoding unit 55, the encoder 2 may be configured to have the operational frequency approximately twice as high as in a normal operation and perform time-division processing, so as to generate a P-picture in the first half of one vertical synchronization period and an I-picture in the second half. Since the I-picture encoding unit 55 is omitted, circuit size is effectively reduced.

Embodiment 3 above may be configured such that an immediately preceding image is referred to in normal processing before an error occurs and an image of two periods before is referred to when an error occurs. In this case, an encoding circuit that uses an immediately preceding image as a reference image and an encoding circuit that uses an image of two periods before as a reference image may be separately implemented so as to switch these circuits depending on presence or absence of an error. Alternatively, time division processing may be performed at an operational frequency as high as in a normal processing, so as to encoding is performed using an immediately preceding image as a reference image in the first half of one vertical synchronization period and encoding is performed using an image of two periods before as a reference image in the second half.

While the embodiments of the present disclosure have been described in detail, the foregoing description is in all aspects illustrative and not restrictive. It is understood that numerous other modifications and variations can be devised without departing from the scope of the invention.

What is claimed is:

1. An image processor comprising:
an encoder configured to encode image data to generate encoded image data; and
a decoder configured to decode the encoded image data received from the encoder,
the encoder including a first memory, an encoding circuit, an error notification receiving circuit, and a first reference image determination circuit,
the decoder including a second memory, a decoding circuit, an error notification sending circuit, and a second reference image determination circuit,
the first memory being configured to store a plurality of local decoded images corresponding to a predetermined number of nearest neighboring vertical synchronization periods, the second memory being configured to store a plurality of decoded images corresponding to a predetermined number of nearest neighboring vertical synchronization periods,
in normal processing in an absence of an error in the decoding circuit,
the first reference image determination circuit being configured to determine to employ a local decoded image generated in a vertical synchronization period of two periods before as a reference image, and the encoding circuit being configured to perform encoding using the reference image,
the second reference image determination circuit being configured to determine to employ a decoded image generated in the vertical synchronization period of two periods before as a reference image, and the decoding circuit being configured to perform decoding using the reference image,
in a presence of an error in a vertical synchronization period in the decoding circuit,
the error notification sending circuit being configured to send an error notification including identification information of an errored image in which the error occurs, and the error notification receiving circuit being configured to receive the error notification,
the first reference image determination circuit being configured to determine to employ a local decoded image generated in a vertical synchronization period immediately preceding a vertical synchronization period in which the error occurs as a reference image in a vertical synchronization period subsequent to the vertical synchronization period in which the error occurs and a vertical synchronization period two periods after the vertical synchronization period in which the error occurs, and the encoding circuit being configured to perform encoding using the reference image,
the second reference image determination circuit being configured to determine to employ a decoded image generated in the vertical synchronization period immediately preceding the vertical synchronization period in which the error occurs as a reference image in the vertical synchronization period subsequent to the vertical synchronization period in which the error occurs and the vertical synchronization period two periods after the vertical synchronization period in which the error occurs, and the decoding circuit being configured to perform decoding using the reference image.

2. The image processor according to claim 1, wherein
the first reference image determination circuit is configured to determine to employ the local decoded image generated in the vertical synchronization period of two periods before as a reference image in a vertical synchronization period subsequent to the vertical synchronization period two periods after the vertical synchronization period in which the error occurs, and
the second reference image determination circuit is configured to determine to employ the decoded image generated in the vertical synchronization period of two periods before as a reference image in the vertical synchronization period subsequent to the vertical synchronization period two periods after the vertical synchronization period in which the error occurs.

3. The image processor according to claim 2,
the decoder further including an image display controller,
the image display controller being configured to instruct to display a predetermined concealing image in the vertical synchronization period in which the error occurs.

4. The image processor according to claim 1,
the encoder further including a return notification receiving circuit,
the decoder further including a return notification sending circuit,
wherein when an error occurs in the decoding circuit in a vertical synchronization period and an attempt to return from the error succeeds in a subsequent vertical synchronization period,
the return notification sending circuit is configured to send a return notification, and the return notification receiving circuit is configured to receive the return notification,
the first reference image determination circuit is configured to determine to employ the local decoded image generated in a vertical synchronization period immediately preceding the vertical synchronization period in which the error occurs as a reference image in a plurality of vertical synchronization periods from the vertical synchronization period subsequent to the vertical synchronization period in which the error occurs until the vertical synchronization period in which the return notification is received, and
the second reference image determination circuit is configured to determine to employ the decoded image generated in the vertical synchronization period immediately preceding the vertical synchronization period in which the error occurs as a reference image in a plurality of vertical synchronization periods from the vertical synchronization period subsequent to the vertical synchronization period in which the error occurs until a vertical synchronization period subsequent to the vertical synchronization period in which the return notification is sent.

5. The image processor according to claim 4, wherein
the first reference image determination circuit is configured to determine to employ the local decoded image generated in the vertical synchronization period of two periods before as a reference image in a vertical synchronization period subsequent to the vertical synchronization period in which the return notification is received, and
the second reference image determination circuit is configured to determine to employ the decoded image generated in the vertical synchronization period of two periods before as a reference image in a vertical synchronization period two periods after the vertical synchronization period in which the return notification is sent.

6. The image processor according to claim 5,
the decoder further including an image display controller,
the image display controller being configured to instruct to display a predetermined concealing image in the vertical synchronization period in which the error occurs.

7. An image processor comprising:
an encoder configured to encode image data to generate encoded image data; and
a decoder configured to decode the encoded image data received from the encoder,
the encoder including a first memory, an encoding circuit, an error notification receiving circuit, and a first reference image determination circuit,
the decoder including a second memory, a decoding circuit, an error notification sending circuit, and a second reference image determination circuit,
the first memory being configured to store a plurality of local decoded images corresponding to a predetermined number of nearest neighboring vertical synchronization periods,
the second memory being configured to store a plurality of decoded images corresponding to a predetermined number of nearest neighboring vertical synchronization periods,
in normal processing in an absence of an error in the decoding circuit,
for an even-numbered image group, the first reference image determination circuit being configured to determine to employ a local decoded image generated in a vertical synchronization period of two periods before as a reference image and the second reference image determination circuit being configured to determine to employ a decoded image generated in the vertical synchronization period of two periods before as a reference image,
for an odd-numbered image group, the first reference image determination circuit being configured to determine to employ a local decoded image generated in a vertical synchronization period of three periods before as a reference image and the second reference image determination circuit being configured to determine to employ a decoded image generated in the vertical synchronization period of three periods before as a reference image,
in a presence of an error in a vertical synchronization period belonging to the even-numbered image group in the decoding circuit,
the error notification sending circuit being configured to send an error notification including identification information of an errored image in which the error occurs, and the error notification receiving circuit being configured to receive the error notification,
in and after a vertical synchronization period two periods after the vertical synchronization period in which the error occurs,
for the odd-numbered image group, the first reference image determination circuit being configured to determine to employ the local decoded image generated in the vertical synchronization period of two periods before as a reference image and the second reference image determination circuit being configured to determine to employ the decoded image generated in the vertical synchronization period of two periods before as a reference image,
for the even-numbered image group, the first reference image determination circuit being configured to determine to employ the local decoded image generated in the vertical synchronization period of three periods before as a reference image and the second reference image determination circuit being configured to determine to employ the decoded image generated in the vertical synchronization period of three periods before as a reference image.

* * * * *